United States Patent [19]
Lewiner et al.

[11] 4,206,369
[45] Jun. 3, 1980

[54] RELAY-LIKE CONTROL DEVICES, TO CONTROL DEVICE MATRIXES AND TO CIRCUITS FOR ACTUATING SUCH DEVICES

[75] Inventors: Jacques Lewiner, Saint-Cloud; Gerard Dreyfus, Villebon sur Yvette-Palaiseau; Jean-Yves Le Traon, Lannion, all of France

[73] Assignee: Agence Nationale de Valorisation de la Recherche and Etat Francais, France

[21] Appl. No.: 863,675

[22] Filed: Dec. 23, 1977

[30] Foreign Application Priority Data

Dec. 31, 1976 [FR] France .................................. 76 39795

[51] Int. Cl.² ........................ H01H 53/02; G09F 9/30
[52] U.S. Cl. .............................. 307/125; 340/166 R;
340/764; 340/783; 340/752; 179/111 E;
307/400
[58] Field of Search .................... 307/115, 125, 132 E,
307/112, 400; 235/98 ME; 340/365 C, 166 R,
373, 783, 752, 764, 166 R, 764 R, 783; 350/269;
335/79, 134; 179/111 E; 200/181

[56] References Cited

U.S. PATENT DOCUMENTS

| 2,931,954 | 4/1960 | Diesel | 200/181 X |
| 3,210,757 | 10/1965 | Jacob | 340/373 |
| 4,065,677 | 12/1977 | Micheron et al | 307/112 |
| 4,078,183 | 3/1978 | Lewiner et al. | 307/112 |

FOREIGN PATENT DOCUMENTS

1189592   3/1965   Fed. Rep. of Germany ........... 307/112

Primary Examiner—L. T. Hix
Assistant Examiner—James L. Dwyer
Attorney, Agent, or Firm—Graves, Donohue & Raymond Brumbaugh

[57] ABSTRACT

A control device comprising three mechanical elements, one of which is mobile relatively to the two others and one of these elements being an electret, whereas the two others are control electrodes. The mechanical mobile element forms a portion partially cut out of a plate 3. Applications to electrical (particularly telephone exchanges and optical information display) switching.

19 Claims, 12 Drawing Figures

RELAY-LIKE CONTROL DEVICES, TO CONTROL DEVICE MATRIXES AND TO CIRCUITS FOR ACTUATING SUCH DEVICES

The invention relates to improvements to control devices of the relay type, to matrixes comprising each a set of such improved control devices and to actuating circuits for the control devices of such matrixes.

In U.S. patent application Ser. No. 639 193 filed Dec. 9, 1975 and corresponding to Japanese Pat. application No. 146 493 filed Dec. 10, 1975 is described a control device of the relay-type which comprises three mechanical elements one of which is movable relatively to the two others, these three mechanical elements being formed, on the one hand, by two control electrodes between which a predetermined potential difference can be applied and, on the other hand, an electret formed by an insulating part carrying positive electric charges and/or negative electric charges whose algebraic sum is different from zero. The movement of the moving mechanical element is used to cause switching; this movable element forms then the moving part of the electrical or optical switch, for example.

The invention has for an object to provide a control device of this kind which is even simpler and more economical than the one described in said patent applications.

The invention has also for an object to provide a control device of the above-mentioned type which permits particularly simple optical switching.

Still another object of the invention is to provide a set of control devices of the above-mentioned type, which forms a matrix of switches, particularly electrical or optical switches, e.g. for telephone exchange or for the display of information.

A further object of the invention is to provide an exciter circuit for the matrix of electrical switches.

The control device of the relay-type in accordance with a first aspect of the invention is characterized in that the moving mechanical element is formed by a part of a plate partially cut out from the rest of said plate while still remaining attached thereto along a line.

A switching matrix according to the invention is characterized in that it comprises a set of such control devices, this matrix comprising a first set of elongated conducting electrodes parallel to a first direction, an insulating plate having a set of cut-out elements spread out in lines and in columns so as to form a matrix whose columns are spread out in the same manner as the electrodes of said first set of electrodes, each of said cut-out elements comprising at least a conducting contact located on the face of said cut-out element which is disposed opposite the first set of electrodes, a second insulating plate disposed facing the first with a matrix of conducting contacts corresponding to the matrix of the contacts of the cut-out elements of the first plate and facing these contacts, and a second set of elongated electrodes parallel to a second direction, different from the first, these electrodes being in contact with the face of the second plate which is opposite that comprising the matrix of conducting contacts, the distribution of these electrodes corresponding to that of the lines of said matrix of contacts. The insulating material forming the first insulating plate (the one which comprises cut-out elements) is either an electret or a non charged insulator.

It is advantageous if the first and/or the second set of elongated electrodes is formed by metal deposits on one face of the first or second plate.

An exciter circuit for the control devices of such a matrix comprises, according to the invention, means for selectively applying, depending on the switching desired, a potential difference of a definite value V between an electrode of the first set and an electrode of the second set, these means being furthermore arranged so as to, on the one hand, apply a potential difference of opposite value −V between the same electrodes, and, on the other hand, to apply a potential difference between said electrodes which is at least equal to a given value substantially less than said definite value, so as to maintain the switching state effected lastly.

Advantageously, this circuit comprises for each electrode of the first and of the second sets, switching control switch means and memory and logic circuit means for modifying the switching state of the control device corresponding to said electrodes at each simultaneous actuation of the control switching means corresponding to these electrodes.

The control device of the relay kind according to a second aspect of the invention is characterised in that the first control electrode is formed by a transparent conducting deposit on a first face of a transparent plate, and in that it presents a bistable operation such that, in its first state, the moving mechanical element, or a part which is integral with this mechanical element, is moved away from said transparent plate and, in its second state, a fraction of the moving mechanical element, or the part which is integral therewith, is in contact with said transparent plate; the coefficient of reflection of said transparent plate observed through its second face is modified when said device passes from one state to another. In a first embodiment of such a control device the electret forms the moving mechanical element. In a second embodiment of said control device, the second control electrode forms said moving mechanical element and the electret is transparent and is applied on the transparent conducting deposit forming the first control electrode.

According to yet another of its aspects, the invention relates to a switching matrix which comprises a set of control devices of the kind in which the moving mechanical element is formed by a part of a plate which is cut out from the rest of said plate while still remaining attached thereto along a line, these control devices being of the optical type. Such a matrix in accordance with the invention comprises a first set of elongated conducting electrodes parallel to a first direction, an insulating plate having a set of cut-out elements distributed in lines and in columns so as to form a matrix whose columns are spread out in the same manner as the electrodes of the first set of electrodes, and a transparent plate on one face of which is applied a second set of electrodes, these latter electrodes being transparent and elongated parallel to a second direction, different from the first, the distribution of these electrodes corresponding to that of the lines of said matrix of cut-out elements. Each of the control devices has a bistable operation such that, in its first state, the cut-out element of the corresponding control device, or a part which is integral with said cut-out elements, is moved away from said transparent plate and, in its second state, a fraction of the cut-out element (or the part which is integral therewith) is in contact with said transparent plate.

As a variation, such a matrix comprising a set of control devices or the optical type is characterised in that it comprises a transparent plate on one face of which is applied a first set of electrodes, these electrodes being also transparent and elongated parallel to a first direction, this face covered with the transparent electrodes being, furthermore, covered with a transparent sheet or layer formed from an insulating material forming an electret, and a second set of elongated conducting electrodes, parallel to a second direction, different to the first, each of these electrodes comprising a set of cut-outs facing the electrodes of the first set. Each control device of this matrix also exhibits bistable operation.

Other aims, characteristics and advantages of the invention will appear from the description of certain embodiments, this description being made with reference to the accompanying drawings in which.

The exciter or actuating circuits must provide the following result: the control voltage applied to a whole row (or line) or to a whole column of the matrix must be higher than the half of the threshold voltage of the relay-type devices of said matrix, but lower than said threshold voltage, in order that only the relay-type device, located at the intersection of a row and of a column which are simultaneously both excited, is actuated.

Figure 1:
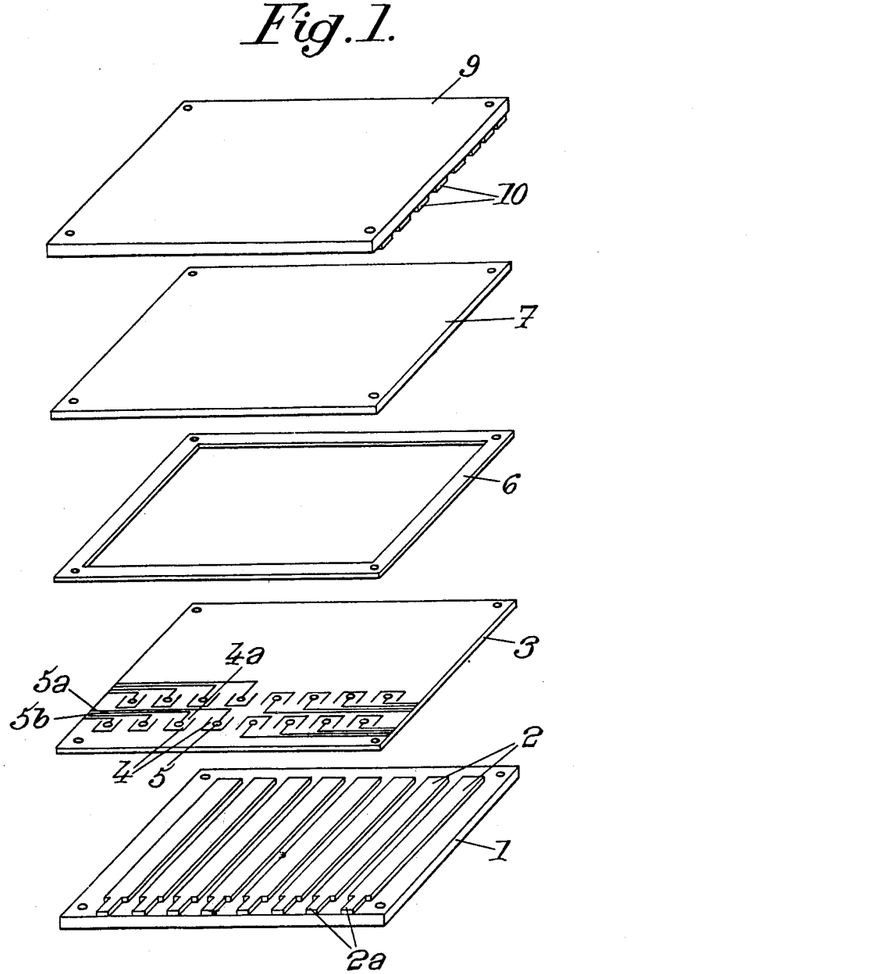
FIG. 1 shows in perspective the different elements of a switching matrix in accordance with the invention.
Figure 2:
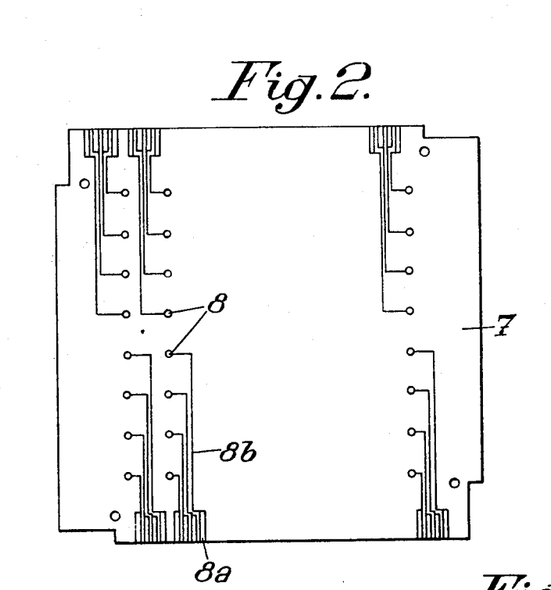
FIG. 2 shows the lower face, with its conducting contacts, of an insulating plate of the matrix shown in FIG. 1.
Figure 3:
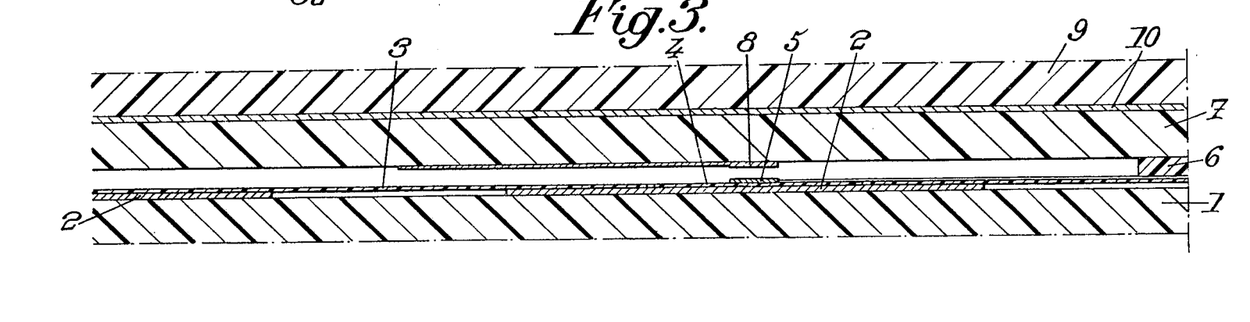
FIG. 3 illustrates, on a larger scale, a vertical section of the matrix shown in FIG. 1, this matrix being in operational state.

The switching matrix which is illustrated in FIGS. 1 to 3 comprises a set of flat plates. The first plate 1 is formed from an insulating material, e.g. that generally used for printed circuit cards. The upper face of this plate 1 comprises metallized portions 2 forming elongated rectilinear electrodes and all parallel to the same direction. In the example, these electrodes are parallel to one side of plate 1 and they have one end 2a of reduced with adjacent one edge of plate 1; these parts 2a of reduced width are for connecting said electrodes with the exciter circuit of the matrix (an example of such a circuit will be described with reference to FIGS. 6a, 6b and 7).

The second plate 3 is formed from an insulating material forming an electret, i.e. carrying positive electrical charges and/or negative electrical charges. In the case where the electret carries charges of opposite signs the algebraic sum of these charges is different from zero.

This plate 3 has a set of cut-outs 4, rectangular or square in the example. More precisely, plate 3 has been cut out at regular intervals along the three sides of a rectangle, the fourth side (imaginary) 4a remaining attached to the rest of plate 3. In other words, the cut-outs 4 form tabs adapted to be moved above or below plate 3 by pivoting about uncut side 4a.

The upper face of each cut-out 4 comprises a conducting contact 5. Finally, as far as plate 3 is concerned, each contact 5 is connected to a corresponding contact 5a on the edge of plate 3 by means of a conducting path 5b. Contacts 5 and 5a and path 5b are formed by metallization of said upper face of plate 3. In the example, the conducting contacts 5a are on the two edges of plate 3 which are parallel to electrodes 2. This plate 3 is made from one of the following materials: polytetrafluoroethylene or fluorated propylene ethylene, such as those known under the respective trademarks Teflon PTFE and Teflon FEP of the firm Dupont de Nemours, polypropylene, polyethylene and a compound containing at least 95% of polychlorotrifluoroethylene, such as that sold by the firm Allied Chemical Corporation under the trademark "Aclar".

The cut-outs 4 (and so contacts 5) are distributed in a matrix whose columns correspond to electrodes 2.

The third plate, referenced 6, of the matrix shown in FIG. 1 is a simple insulating wedge for separating the insulating plate 3 from a corresponding plate 7. In the example, this wedge 6 has the shape of a rectangular frame comprising an opening whose shape and dimensions are sufficient, when this wedge 6 is disposed on plate 3, for the set of cut-outs 4 to be located in said opening. This plate 6 may be formed from any insulating material, such as for example, polyethylene terephtalate or polypropylene.

Plate 7 is also an insulating plate which has on its lower face, as shown in FIG. 2, a network or matrix of conducting contacts 8. These contacts 8 correspond to the contacts of plate 3; in other words, as will be seen further on in reference to FIG. 3, when the matrix shown in FIG. 1 is assembled a set of facing contact pairs 5 and 8 is obtained. To each contact 8 there corresponds, on one side of plate 7, a conducting contact 8a. The electrical connection between contacts 8 and 8a is formed by conducting paths 8b on plate 7. In the example, this latter is formed from an insulating material such as polyvinylidene fluoride.

Finally, the last plate 9 of the matrix shown in FIG. 1 is similar to plate 1. It has on its lower face elongated and parallel electrodes 10, formed by metallized portions on said plate 9. The direction of these electrodes is perpendicular to that of electrodes 2. These electrodes 10 correspond to the lines of the matrix of conducting contacts 5 or 8.

It will be noted that, with the line electrodes 10 and the column electrodes 2 there is formed a matrix of capacitors located at the different junction points (imaginary) between these lines and columns. Between the plates of each of these capacitors is located a pair of conducting contacts 5 and 8 (FIG. 3) forming controlled contacts as will be seen below.

In the absence of a potential difference of sufficient value applied between line electrode 10 and column electrode 2 which correspond to a definite capacitor, contacts 5 and 8 remain removed from one another and the circuit (not shown) in which these contacts 5 and 8 are installed remains open. When a potential difference V of given value and sign is applied between said electrodes 10 and 2, cut-out 4 comprising contact 5 is moved towards plate 7 through the opening of wedge 6 so as to butt against contact 8. Thus the circuit is closed in which are disposed contacts 5 and 8. In other words, switching or "junction" has been established.

In order to cancel said switching or junction, it is necessary to apply a potential difference of value $-V$ between said electrodes 10 and 2. If the potential difference applied between the electrodes is zero or at most equal to a critical value the switching state is not modified.

Figure 4:
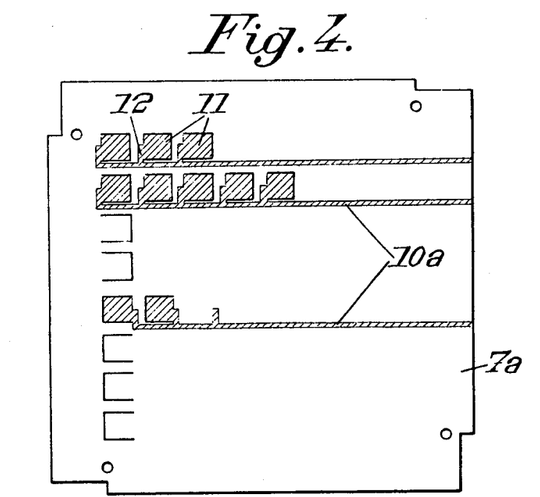
FIG. 4 is a view of the upper face of an insulating plate and of the upper electrodes of a variation of the matrix shown in FIG. 1.

The switching matrix which has just been described with reference to FIGS. 1 and 3 can, of course, lend itself to numerous variations still within the scope of the invention. In particular, in one variation, plate 3 formed by an electret does not have cut-outs but it is the corresponding insulating plate which is provided with cut-outs. Such a plate 7a is shown in FIG. 4. This latter Fig. shows the upper face of this plate 7a. This latter has a network of cut-outs 11 on the lower faces of which are to be found the corresponding conducting contacts (not visible in FIG. 4). Furthermore, in the embodiment shown, no upper plate 9 is provided. In fact, in this example, the line electrodes 10a are formed by metallized portions of the upper face of said insulating plate 7a. So as to ensure the permanent electrical connection between the metallized electrodes 10a and the corresponding capacitor plates, the upper faces of cut-outs 11 are also metallized and connected to the corresponding electrodes by means of a conducting path 12 passing through the connection line (imaginary) of the cut-outs 11 with the rest of the plate 7a.

Similarly, electrodes 2 may be formed by metallized portions of plate 3.

Although in the examples shown in FIGS. 1 to 4 plates 3 and 7 (or 7a) are perfectly flat, it is however possible to have a network of projections or protuberances on one and/or the other of these plates at the conducting contacts so as to provide a better physical contact between the corresponding conducting contacts 5 and 8. These projections or protuberances may be formed, for example, by die-forging said plates 3 and/or 7.

It should also be noted that each capacitor may comprise several conducting contact pairs 5, 8; in this case each contact pair is preferably electrically insulated from the other pairs of the same capacitor.

It is also to be noted that the insulating plate not provided with cut-outs (plate 7 in FIG. 1) may be laminated on to plate 9.

It will also be noted that wedge 6 can be formed by a grid comprising a set of openings (not shown) corresponding to each capacitor, i.e. to each contact pair 5, 8.

In another variation (not shown), the plate provided with cut-outs is made in two parts laminated or stuck together. The first part is formed by a plate of a rigid material and the second part is formed by an insulating plate charged or not. The purpose of said rigid plate is to give to the cut-out elements sufficiently rigidity to ensure a good conducting contact; in fact, with a flexible cut-out element it is difficult to achieve a good contact. Furthermore, preferably, said rigid plate has an elasticity which is selected to satisfy the two following conditions. The first of these conditions is that in the "closed" position, the electrostatic forces (which are inversely proportional to the square of the distance separating the electrodes) are greater than elastic return force of the cut-out element. The second condition is that in the "open" position, the elastic return force is greater than the electrostatic force.

In one particular embodiment of these latter arrangements, said rigid plate is made from a material such as spring steel. In this case, it is advantageous that this plate is covered with an insulating layer separating the steel plate from the plate carrying the conducting contacts. This insulating layer is formed, for example, by an insulating varnish deposited by painting or spraying or by any other process; this layer can also be formed by an insulating sheet such as a plastic film stuck or laminated on to said metal plate.

As in the case of the control device described in the parent patent, it is advantageous to dispose the matrix in an hermetically sealed enclosure in which there is formed a vacuum or in which there is introduced a pressurized gas or a gas with a high ionisation tension. It is also advantageous that the insulator forming plate 7 has a high dielectric constant; in this case, the electric field is specially concentrated outside this insulating plate and the control voltage V is reduced. Besides polyvinylidene fluoride for forming said plate 7 with a high dielectric constant, one of the copolymers of this fluoride can be used or ceramics deposited on plate 9 by evaporation in vacuum or as a thin foil.

There will now be described with reference to FIGS. 5 to 7 an embodiment for exciter circuits for a matrix according to the invention.

Figures 5, 6A, 6B, 7, 8, 9, 10, 11:
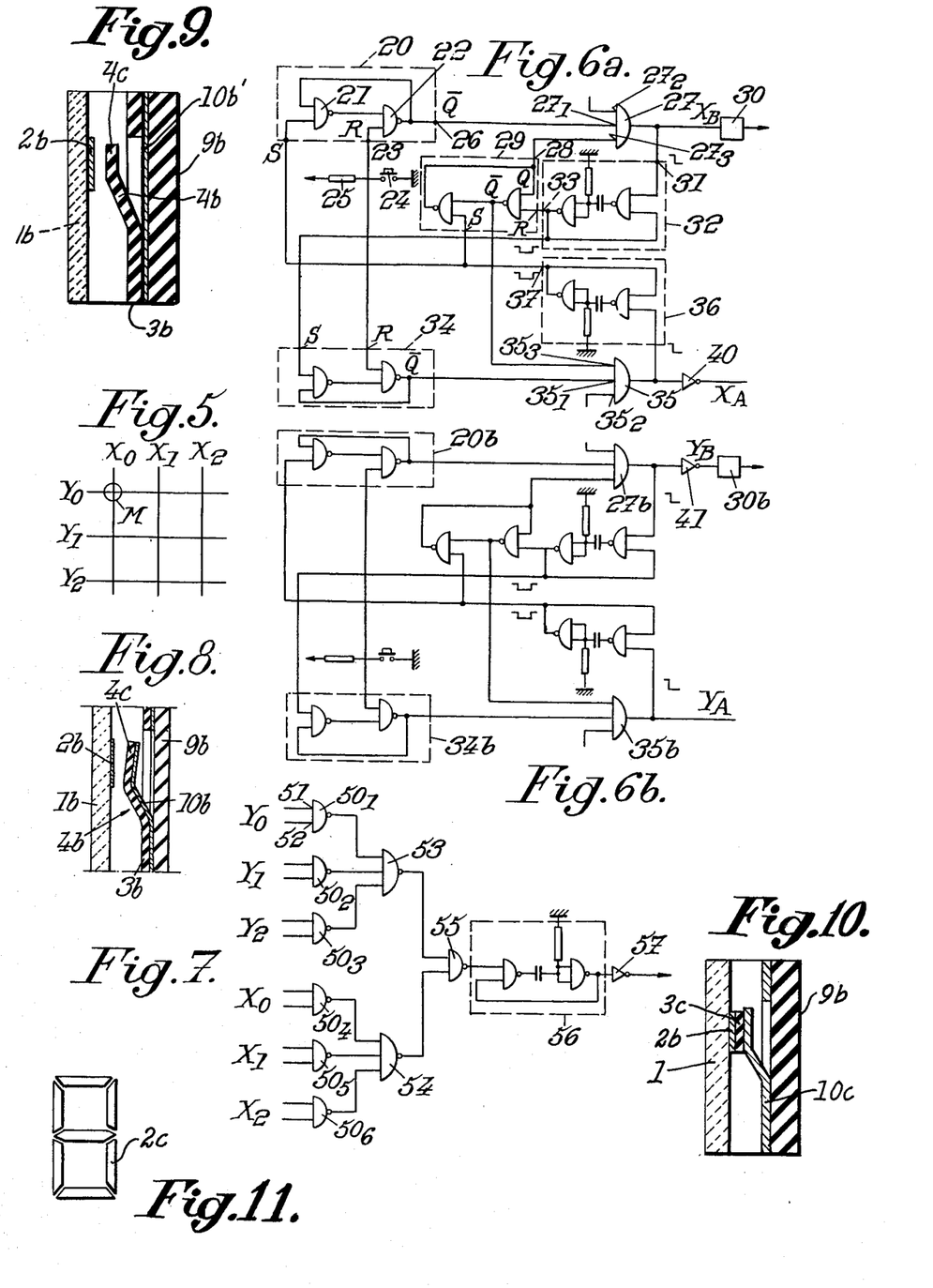
FIG. 5 is a simplified diagram showing the control electrodes of a matrix in accordance with the invention.
FIGS. 6a and 6b illustrate a part of the exciter circuit for the control electrodes of a matrix according to the invention.
FIG. 7 shows another part of said exciter circuit of the invention.
FIG. 8 illustrates a control device for an optical display matrix.
FIG. 9 illustrates an alternate control device for an optical display matrix.
FIG. 10 illustrates another alternate control device for an optical display matrix.
FIG. 11 illustrates a set of switching elements having the shape of elongated segments and arranged in a set of seven segments having the form of an "8".

The exciter circuits shown in FIGS. 6a, 6b and 7 are intended to generate control pulses applied to column electrodes 2 or line electrodes 10. In FIG. 5 are shown schematically three column electrodes $X_0, X_1, X_2$ and three line electrodes 10 $Y_0, Y_1$ and $Y_2$. The generator shown in FIG. 7 corresponds to this same example.

Before describing the circuits shown in FIGS. 6 and 7 in detail, for a better understanding of the design and operation of these circuits, attention is drawn to the fact that each capacitor of the matrix can have three states, i.e. a "junction" state, a "drop-out" state and a "memorisation" state. As already mentioned above, to obtain the junction state, it is necessary that the potential difference between a column electrode and a line electrode is equal to a definite value V; in other words:

$$V_X - V_Y = V$$

To obtain the fall-out state, this potential difference must satisfy the following condition:

$$V_X - V_Y = -V$$

Finally the memorisation state corresponds to a zero value of the potential difference $V_X - V_Y$ or, at least, to a value which (in absolute value) does not exceed the quantity $\pm V/2$.

It will be noted that the capacitor must be in the junction or fall-out state only for a relatively short time whereas the memorisation state must be as long as possible.

In the example, the junction state is achieved with:

$$V_X = V \text{ and } V_Y = 0$$

The fall-out state is achieved with $V_X=0$ and $V_Y=V$.

Finally in the memorisation state, we have $V_X=V_Y=0$.

Since each capacitor may have three states, the potential state of each electrode is represented by a two digit binary number (or bits) according to table 1 below:

Table 1

|  | $X_BX_A$ | $Y_BY_A$ |
|---|---|---|
| Junction | 1 1 | 0 0 |
| Memorisation | 0 1 | 0 1 |
| Fall-out | 0 0 | 1 1 |

The binary number $X_BX_A$ or $Y_BY_A$ represents not only the operation which the electrode achieves (junction, memorisation or fall-out control) but also the corresponding potential state. In fact, according to table 1 above, it can be seen that the potential of each electrode is equal to $X_B.V$ or $Y_B.V$.

Finally, it will also be noted that when we pass from the junction state to the memorisation state, in the corresponding binary numbers $X_BX_A$ and $Y_BY_A$, only a single digit is changed. Likewise, the going over from the memorisation state to the fall-out state only causes the modification of a single binary digit in each of the numbers $X_BX_A$ and $Y_BY_A$.

These considerations have permitted the construction of the exciter circuits shown in FIGS. 6 and 7, as will be better seen from the description of the operation of these circuits.

FIG. 6a shows the part of an exciter circuit associated with a column electrode having a definite position, column $X_O$ (FIG. 5) in the example. FIG. 6b corresponds to the part of the exciter circuit which is associated with a line control electrode of definite position, line $Y_O$ in the example. These FIGS. 6a and 6b are similar and so only FIG. 6a will be described in detail.

The circuit shown in FIG. 6a comprises a first flip-flop 20 of the asynchronous RS type comprising two AND-NO gates 21 and 22. Input R 23 of flip-flop 20 is connected to earth through a switch 24, which, in the example, is a push-button. This output 23 is also connected to a source (not shown) providing a potential signal of definite value through a resistor 25 having a value of 500 ohms in the example.

The $\overline{Q}$ output 26 of flip-flop 20 is connected to the first input $27_1$ of a three input AND gate 27. The second input $27_2$ of this gate 27 is connected to the output of a generator of a signal controlling the junction or fall-out operation, this generator will be described later on with reference to FIG. 7. The third input $27_3$ of this gate 27 is connected to the $\overline{Q}$ output 28 of another flip-flop 29 also of the asynchronous RS type. The output of AND gate 27 is connected to the corresponding column control electrode ($X_O$) through an amplifier 30. This output of AND gate 27 is also connected to the input 31 of a monostable flip-flop 32 whose output 33 is connected to the input R of flip-flop 29. This output 33 of monostable flip-flop 32 is also connected to input S of a third flip-flop 34 of the asynchronous RS type.

Input R of flip-flop 34 is, like the input R 23 of flip-flop 20, connected at the common point to resistor 25 and to switch 24. The $\overline{Q}$ output of this flip-flop 34 is connected to the first input $35_1$ of a second AND gate 35 having three inputs. The second input $35_2$ of gate 35 is connected to the output of the generator shown in FIG. 7 and the input $35_3$ is connected to the $\overline{Q}$ output of flip-flop 29. The output of this AND gate 35 is connected to the input of a second monostable flip-flop 36 whose output 37 is connected, on the one hand, to the input S of the flip-flop 29 and, on the other hand, to the input S of flip-flop 20.

The output of AND gate 35 is also connected to the input of an inverter 40.

The output signal of AND gate 27 represents the binary number $X_B$ and the output signal of inverter 40 represents the binary signal $X_A$.

The circuit shown in FIG. 6b is identical to the circuit shown in FIG. 6a with however the following difference: AND gate 27b is connected to the input of an amplifier 30b through an inverter 41. At the output of inverter 41 appears a signal representing the binary number $Y_B$ and at the output of AND gate 35b appears a signal representing binary number $Y_A$.

The generator circuit shown in FIG. 7 comprises, in the example, six AND-NO gates referenced $50_1$ to $50_6$, each with two inputs. Each AND-NO gate $50_1$–$50_6$ is associated with a line electrode or with a column electrode as shown by the references $X_0, X_1, X_2$ and $Y_0, Y_1, Y_2$ in FIG. 7. Furthermore, the inputs of these gates are connected to the $\overline{Q}$ output of the respective flip-flops 20 and 34 (or 20b and 34b) of the exciter circuit part associated with the corresponding electrode. Thus, if we suppose that the circuit shown in FIG. 6b corresponds to line $Y_O$ input 51 of gate $50_1$ is connected to the $\overline{Q}$ output of flip-flop 20b and the input 52 of this gate $50_1$ is connected to the $\overline{Q}$ output of flip-flop 34b.

In addition, the generator shown in FIG. 7 comprises two AND-NO gates 53 and 54 with three inputs each. The first, second and third inputs of gate 53 are connected respectively to the outputs of gates $50_1$, $50_2$ and $50_3$. similarly, the first, second and third inputs of gate 54 are connected respectively to the outputs of gates $50_4, 50_5$ and $50_6$.

The output of gate 53 is connected to the first input of an AND-NO gate 55 having two inputs whose second input is connected to the output of gate 54.

The output of said AND-NO gate 55 is connected to the input of a monostable flip-flop 56 whose output is connected to the different inputs $27_2$ and $37_2$ of the AND gates of circuits associated with each electrode through an inverter 57.

We shall now consider the different operational modes of the circuits which have just been described with reference to FIGS. 6 and 7.

This operation will only be described with reference to FIGS. 6a and 7, the operation of the circuit shown in FIG. 6b being easily deduced therefrom.

Let us assume first of all that the capacitor corresponding to point M (FIG. 5) and with which are associated circuits of FIGS. 6a and 6b, is in the memorisation state. In this case, the signal appearing at the $\overline{Q}$ output 26 of flip-flop 20 corresponds to "0" (or state "0"), the signal at the Q 28 output of flip-flop 29 corresponds to "1", the signal at the $\overline{Q}$ output of this same flip-flop 29 corresponds to 0 and the signal from the $\overline{Q}$ output of flip-flop 34 corresponds to 1. We assume also that switch 24 is not actuated, i.e. that the inputs R of flip-flops 20 and 24 are in the 1 state.

Therefore, since the $\overline{Q}$ output 26 of flip-flop 20 is in the 0 state, the output of AND gate 27 is in the 0 state and we get $X_B=0$. Similarly, since the $\overline{Q}$ output of flip-flop 29 is 0, the output of AND gate 35 is also 0 and so we have $X_A=1$ at the output of inverter 40.

To go to the junction state, it is sufficient to press pushbutton 24. In fact, in this case the R inputs of flip-flops 20 and 34 are brought to the 0 state and the two outputs of these flip-flops assume then the 1 state. It is recalled in fact that the truth table of RS flip-flops of the asynchronous type is the following:

TABLE II

| R | S | Q | $\overline{Q}$ |
|---|---|---|---|
| 0 | 1 | 0 | 1 |
| 1 | 0 | 1 | 0 |

Inputs $27_1$ and $27_3$ of AND gate 27 are then in state 1. If input $27_2$ receives a signal of value 1 the output of gate 27 goes over to state 1, i.e. $X_B=1$. On the other hand, since the $\overline{Q}$ output of flip-flop 29 remains at 0 we still get $X_A=1$, even if input $35_2$ of AND gate 35 receives a signal of value 1. So we have $X_B X_A=11$ which corresponds to the junction state.

When the signal applied to input $27_2$ of gate 17 assumes again the value 0, the output of this gate 27 also goes from value 1 to value 0. So we have a descending front of a pulse which triggers monostable flip-flop 32 whose output is permanently in the 1 state and which assumes state 0 during a specific period of time, (of the order of a few microseconds or milliseconds). Thus, input S of flip-flop 34 assumes the 0 state during this specific period of time; the result is that the $\overline{Q}$ output of this flip-flop 34 and the Q 28 output of flip-flop 29 are brought to the 0 state. Thus, we obtain $X_B=0$ and $X_A=1$ which corresponds to the "memorisation" state.

Therefore, if push-button 24 is not pressed, i.e. if signals of value 1 are applied to the R input of flip-flops 20 and 34, we still obtain the memorisation state with $X_B X_A=01$.

On the other hand, if at the moment when the pulse produced by monostable 32 appears, push-button 24 is reset to the engaged state, the $\overline{Q}$ outputs of flip-flops 20 and 34 are brought to state 1, the Q and $\overline{Q}$ outputs of flip-flop 29 remaining respectively in the 0 and 1 states. Inputs $35_1$ and $35_3$ of AND gate 35 are then in state 1 and if, at this moment, a signal of value 1 is applied to input $35_2$, we obtain $X_A=0$. At this moment, we also have $X_B=0$ for input $27_3$ of gate 27 receives a signal of value 0, we have thus gone over to the fall-out state.

When the signal applied to input $35_2$ again to value 0, the monostable 36, which is similar to monostable 32, is triggered and the signals at the S input of flip-flops 29 and 20 assume momentarily the 0 state which brings the $\overline{Q}$ outputs of flip-flops 20 and 29 to the 0 state. We then come back to the state $X_B X_A=01$, i.e. the memorisation state.

We can resume the operation of the circuit of FIG. 6a in the following way. After having established a junction state or a fall-out state, this circuit comes back to the stable memorisation state. If we actuate again push-button 24, the circuit of FIG. 6a is ready to effect a reverse switching; this latter is achieved when a signal of value 1 is applied to inputs $35_2$ and 27 of AND gates 35 and 27.

This latter signal is generated by the generator shown in FIG. 7. This generator produces a signal of value 1 during a period-which is determined by monostable 56—when push-buttons 24 and 24b (FIG. 6b) are simultaneously engaged. In fact, therefore, inputs 51 and 52 of gate $50_1$—which are connected to the $\overline{Q}$ outputs respectively of flip-flops 20 and 34—are both in state 1; the same goes for the inputs of gate $50_4$. The outputs of these gates $50_1$ and $50_4$ are then brought to the 0 state. The result is that the outputs of gates 53 and 54 are in state 1 and the output of gate 55 goes to state 0. The changeover from state 1 to state 0 of the output of gate 55 triggers monostable 56. Thus we obtain a signal at the output of the generator shown in FIG. 7 for a definite period of time at each new actuation of push-buttons 24 and 24b.

The matrix of electrical switches and the exciter circuits in accordance with the invention may be used for switching in telephone exchanges. In this case the matrix has the advantage of occupying a reduced space. In addition the energy required for switching is of the order of 10,000 to 100,000 times less than that consumed in coil elelctromagnetic devices. In addition, in an open circuit, the control circuits have no leakage current, since the controlled contacts are no longer in contact. Moreover, the manufacture of such a matrix is inexpensive. It should also be noted that the different connection points are independent of each other. The switching of several points can thus be achieved simultaneously (in particular of the same line or of the same column, irrespective of their position.)

However, the invention is not limited to electrical circuit switching applications. It can also be used for other switching, as for example optical switching.

In a particular embodiment of this latter arrangement, plate 1 and/or plate 9 is made from a transparent material such as glass and the corresponding electrodes (2 or 10) are formed by transparent metal deposits or metal oxides on said glass plate ; furthermore, in this case, contrarily to the matrix of switches shown in FIG. 1, there is provided neither plate 7 nor conducting contact 5 on the cut-out plate. In this embodiment, after switching, a part of the corresponding cut-out—or an element integral with this latter—is applied against one face of the transparent plate. Thus, coefficient of reflection of said plate seen through the other face is modified. The surface of the material thus contacted with one face of the transparent plate is chosen or treated so that there is obtained a satisfactory contrast between, on the one hand, the part of the face of the transparent plate against which is applied the cut-out part (or an element integral with this latter) and, on the other hand, the rest of said plate.

An example of a control device for such a matrix is shown diagramatically, in section, in FIG. 8. In this example, the matrix comprises a glass plate 1b on one face of which are deposited transparent electrodes 2b made of tin oxide; these electrodes form the column electrodes. The matrix in question comprises also a plate 3b made from an insulating material forming an elelctret and having cutouts 4b. Each cut-out 4b comprises an end part 4c having a flat surface of substantially the same width as electrode 2b. In the rest position, part 4c is oblique in relation to the surface of plate 1b; therefore, in the excited condition, the flat face of part 4C of the cut-out is in contact with the surface of plate 1b at electrode 2b.

The light which provides for illuminating the device comes either from the left of glass plates 1b (as seen on the drawing) or through the edge of said plate.

The face of plate 3b which is not facing plate 1b is covered with a network of electrodes 10b forming metalized portions similar to those shown in FIG. 4. These electrodes 10b form line electrodes. Finally, there is provided a support plate 9b for plate 3b.

It is to be noted here that it is not indispensable for the network of electrodes 10b to be formed by metallized portions of plate 3b. Electrodes 10b on plate 9b as shown in FIG. 9. The advantage of this latter embodiment resides in the fact that, contrarily to the cut-outs 4b shown in FIG. 8, the cut-outs of the electret are not necessarily rigid.

Another variation, shown in FIG. 10, a transparent electret 3C forming insulating foil is applied on the face of the transparent plate 1b on which are already deposited electrodes 10c 2b. In this variation there is provided a network of electrodes with cut-outs having the same shape as the cut-out shown in FIG. 8.

A matrix of optical switches of said kind can be used for constructing an information display, e.g. in the form of digits and letters. For this purpose, the parts of the cut-outs (or of the elements which are integral therewith) which are intended to be applied against one face of said transparent plate have the form of elongated segments and these segments are distributed (in a way known per se particularly for liquid crystal displays) in groups of seven segments forming an eight (8) such as elements 2c, which are shown in FIG. 11; the selective excitation of the corresponding capacitor permits a letter or a digit to be formed at will. Such an optical display means has, in relation to the liquid crystal type display, the advantage of being able to be constructed in large sizes. Moreover, it is not necessary to provide a holding current for such a display device in accordance with the invention.

As is evident and as it follows moreover already from what has gone before, the invention is in no wise limited to those of its embodiments and modes of application which have been more especially considered; it embraces, on the contrary, all variations thereof.

It will be obvious to those skilled in the art that many variations may be made in the embodiments chosen for purpose of illustration without departing from the scope of the invention as defined by the appended claims.

We claim:

1. A control device of the relay kind comprising three mechanical elements one of which is mobile in relation to the two others, these three elements being formed, on the one hand, by two control electrodes between which is applied a predetermined potential difference and, on the other hand, an electret formed by an insulating piece positive electrical charges and/or negative charges whose algebraic sum is different from zero, characterised in that the mobile mechanical element is formed by a part of a plate which is cut out from the rest of the plate while remaining attached thereto along a single line.

2. A switching matrix comprising a first set of elongated conducting electrodes parallel to a first direction, a first insulating plate having a set of mobile mechanical elements distributed in lines and in columns so as to form a matrix whose columns are spread out in the same way as the electrodes of said first set of electrodes, each of said mobile elements comprising a part of said plate cut out from the rest of said plate while remaining attached thereto along a single line, each of said mobile elements having at least one conducting contact situated on the face of said element which is disposed opposite the first set of electrodes and the assembly of said conducting contacts forming a first matrix of conducting contacts, a second insulating plate diposed facing the first with a second matrix of conducting contacts corresponding to the first matrix of conducting contacts and facing these contacts, and a second set of elongated electrodes parallel to a second direction, different from the first, these last mentioned elelctrodes being in contact with the face of said second plate which is opposite that comprising the second matrix of conducting contacts, the distribution of these electrodes corresponding to the lines of said matrix of contacts.

3. A matrix according to claim 2, characterised in that the insulating material forming the first plate is an electret.

4. A matrix according to claim 2, characterised in that the insulating material forming the first plate is a non charged insulator.

5. A matrix according to claim 2 characterized in that, at the conducting contact, each element comprises a projection.

6. A matrix according to claim 2, characterised in that the first set and/or the second set of elongated electrodes is formed by metal deposits on one face of both insulating plates.

7. A switching matrix as specified in claim 2, further comprising an exciter circuit including means for selectively applying, depending on the switching desired, a potential difference of a definite value V between an electrode of the first set and an electrode of the second set, these means being, furthermore, arranged so as to, on the one hand, apply a potential difference of the opposite—V between the same electrodes and, on the other hand, to apply a potential difference between said electrodes which is at least equal to a given value substantially less than said definite value, so as to maintain the state of the switching effected lastly.

8. A switching matrix according to claim 7, further comprising for each electrode of the first and the second sets switching control switch means and logic and memory circuit means for modifying the switching state of the control device corresponding to said electrodes at each simultaneous actuation of the control switch means corresponding to these electrodes.

9. A switching matrix comprising a first set of elongated conducting electrodes parallel to a first direction, an insulating plate having a set of mobile mechanical elements distributed in lines and in columns so as to form a matrix whose columns are spread out in the same way as the electrodes of the first set of electrodes, each of said mobile elements comprising a part of said plate cut out from the rest of said plate while remaining attached thereto along a singly line, and a transparent plate on one face of which is applied a second set of electrodes, these electrodes being transparent and elongated parallel to a second direction, different from the first, the distribution of these electrodes corresponding to that of the lines of said matrix of mobile elements, each of said elements exhibiting a bistable operation such that, in its first state, the mobile element is moved away from said transparent plate and, in its second state, at least part of the mobile element is in contact with said transparent plate.

10. A switching matrix comprising a transparent plate on one face of which is applied a first set of electrodes, these electrodes being transparent and elongated parallel to a first direction, said face covered with the transparent electrodes being also covered with a foil or a transparent layer of an insulating material forming an electret, and a second set of elongated conducting electrodes parallel to a second direction, different from the first, each of these electrodes comprising a set of mobile elements cut out from said elongated electrodes and attached thereto along a single line said mobile elements being disposed facing the electrodes of the first set, each of said mobile elements exhibiting a bistable operation such that, in its first state, the mobile element is moved away from said transparent plate and, in its second state, at least a part of said element is in contact with said transparent plate.

11. A switching matrix according to claim 9 characterized in that said parts of said mobile elements each have the shape of an elongated segment and in that these segments are arranged in sets of seven segments, each of these sets having the form of an eight.

12. A display comprising three mechanical elements at least one of which is mobile said mobile element comprising a part cut out from a plate and attached to said plate along a singly line said elements including two control electrodes between which can be applied a predetermined potential difference and an electret formed by an insulating piece carrying positive electrical charges and/or negative electrical charges whose algebraic sum is different from zero, wherein the first control electrode is formed by a transparent conducting deposit on a first surface of a transparent plate and wherein said mobile element exhibits a bistable operation such that, in its first state, the mobile mechanical element is moved away from said transparent plate and, in its second state, at least a part of the mobile mechanical element is in contact with said transparent plate, the coefficient of reflection of said transparent plate observed through its second face being modified when the element changes over from one state to the other.

13. A control device according to claim 12, characterised in that the electret forms said mobile mechanical element, the second control electrode comprising a conducting deposit on the face of said electret which is opposite the first control electrode.

14. A control device according to claim 12, characterised in that the second control electrode forms said mobile mechanical element, the electret being transparent and being applied on the transparent conducting deposit forming said first control electrode.

15. A control device according to claim 12, characterised in that the electret forms said mobile mechanical element and in that said device comprises a support plate on which is disposed the second control electrode.

16. A display device comprising two control elements between which can be applied a predetermined potential difference and an electret formed by an insulating piece carrying positive electrical charges and/or negative electrical charges whose algebraic sum is different than zero, wherein the first control electrode is formed as a transparent conducting deposit on a first surface of a transparent palte, wherein said electret comprises a mobile element comprising a part cut out from a plate and attached to said plate along a single line, and wherein the second control electrode comprises a conductive deposit on a surface of said electret which is opposite the first control electrode, said mobile element exhibiting a bistable operation such that, in its first state, the mobile element is moved away from said transparent plate, and in its second state at least a part of said mobile element is in contact with said transparent plate, the coefficient of reflection of said transparent plate, observed through its second surface being modified when the element changes over from said first to said second state.

17. A display device comprising two control electrodes between which can be applied a predetermined potential diffeience and an electret formed by an insulating piece carrying positive electric charges and/or negative electrical charges whose algebraic sum is difference than zero, wherein the first control is formed as a transparent conducting deposit on a first surface of a transparent plate, wherein said electret is formed as a transparent insulating deposit on said transparent conducting deposit, and wherein said second control electrode comprises a mobile element comprising a part cut out from a conductive plate and attached to said plate along a single line, said mobile element exhibiting a bistable operation such that, in its first state the mobile element is moved away from said transparent plate, and in its second state, at least a part of said mobile element is in contact with said transparent plate, the coefficient of reflection of said transparent plate observed through its second surface being modified when the element changed from said first to said second state.

18. A switching matrix as specified in claim 9 wherein said insulating plate comrises an electret.

19. A switching matrix according to claim 10 characterized in that said parts of said mobile elements each have the shape of an elongated segment and in that these segments are arranged in sets of seven segments, each of these sets having the form of an eight.

* * * * *

UNITED STATES PATENT AND TRADEMARK OFFICE
CERTIFICATE OF CORRECTION

PATENT NO. : 4,206,369
DATED : June 3, 1980
INVENTOR(S) : Jacques Lewiner et al.

It is certified that error appears in the above-identified patent and that said Letters Patent are hereby corrected as shown below:

First page, 2nd col., Attorney, Agent, or Firm, "Graves, Donohue & Raymond Brumbaugh" should read --Brumbaugh, Graves, Donohue & Raymond--;
Column 2, line 65, "elements" should read --element--;
Column 3, line 64, "with" should read --width--;
Column 8, line 35, "similarly" should read --Similarly--;
Column 9, line 1, after "go" insert --over--;
Column 9, line 46, after "35$_2$" insert --passes--;
Column 10, line 38, after "Thus," insert --the--;
Column 10, line 53, "elelctret" should read --electret--;
Column 11, line 3, "10b" should read --10b' may be disposed--;
Column 11, line 11, delete "10c";
Column 11, line 12, after "electrodes" insert --10c--;
Column 11, line 47, after "negative" insert --electrical--;
Column 12, line 3, "elelctrodes" should read --electrodes--;
Column 12, line 48, "singly" should read --single--;
Column 13, line 16, "singly" should read --single--;
Column 14, line 6, "palte" should read --plate--; and
Column 14, line 39, "changed" should read --changes--.

Signed and Sealed this

Twenty-eighth Day of October 1980

[SEAL]

Attest:

SIDNEY A. DIAMOND

Attesting Officer

Commissioner of Patents and Trademarks